(12) United States Patent
Weldy

(10) Patent No.: US 6,574,365 B1
(45) Date of Patent: Jun. 3, 2003

(54) CORRECTION OF COLOR BALANCE IN IMAGES

(75) Inventor: John A. Weldy, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/467,408

(22) Filed: Dec. 20, 1999

(30) Foreign Application Priority Data

Dec. 23, 1998 (GB) .............................................. 9828314
Sep. 10, 1999 (GB) .............................................. 9921300

(51) Int. Cl.[7] .................................................. G06K 9/00
(52) U.S. Cl. ........................ 382/167; 358/1.9; 358/518
(58) Field of Search ................................. 382/162, 167, 382/274, 260–264; 358/1.9, 500, 515–523, 506; 345/589, 597–604; 430/21; 348/675, 674, 649, 687, 650, 688, 652, 654, 661, 223.1

(56) References Cited

U.S. PATENT DOCUMENTS

| | | | |
|---|---|---|---|
| 4,677,465 A | | 6/1987 | Alkofer ........................ 358/506 |
| 4,729,016 A | | 3/1988 | Alkofer ........................ 358/522 |
| 5,420,705 A | * | 5/1995 | Ray .............................. 358/523 |
| 5,534,948 A | * | 7/1996 | Baldwin ....................... 348/675 |
| 5,555,022 A | | 9/1996 | Haruki et al. ............. 348/223.1 |
| 5,641,596 A | * | 6/1997 | Gray et al. ..................... 430/21 |

FOREIGN PATENT DOCUMENTS

EP          1014695 A2 *   6/2000    ............ H04N/1/60

* cited by examiner

Primary Examiner—Phuoc Tran
Assistant Examiner—Ishrat Sherali
(74) Attorney, Agent, or Firm—Brenda J. Barker; Thomas H. Close

(57) ABSTRACT

The invention relates to the color correction of images. The method is based on the assumption that the red, green and blue standard deviations, particularly of high frequency spatial information, as calculated in a particular space e.g. a power law space, should be equal.

8 Claims, 4 Drawing Sheets

CORRECTION OF COLOR BALANCE IN IMAGES

FIELD OF THE INVENTION

This invention relates to color printing, and more particularly to a method for automatically adjusting color correction. In addition, this method may be applied to white balance adjusting apparatus such as that used in a color video camera.

BACKGROUND OF THE INVENTION

In photographic printing, it is a well known practice to correct the color balance of a print from an original, such as a color photographic negative, by adjusting the printing process so that the integral density of the resulting print is neutral or grey. This correction strategy is based on the assumption that the overall average color of a scene integrates to a grey color. This strategy is very effective at reducing the effects resulting from scene illuminants that are spectrally different such as tungsten and daylight. In a like manner, image sensing apparatus such as a video camera, average typically, over a relatively long time period, color difference signals, R-Y and B-Y, to a zero value. This is equivalent to integrating to grey.

These methods work well for the majority of scene and illuminant combinations. However, when the scene subject matter is highly colored, particularly with a single dominant color, the integrate to grey strategy fails as this dominant scene color is mistaken for an illuminant bias. This failure, known as subject failure, produces unpleasant color casts in the color complimentary to the dominant scene color. There are various strategies for minimizing these failures. These strategies are typically based on reducing the amount of correction based on a population of images and/or on information in neighboring frames. The Agfa MSP printer is an example where information in neighboring frames is used to improve color correction.

In addition, it is possible, particularly with digitization, to extract additional information from an image that can be used to improve color correction and reduce the number of subject failures. Many of these methods, such as that taught in U.S. Pat. No. 5,555,022, divide the scene information into a plurality of regions representing different locations within a scene. Means to select and weight the correction of these regions are then employed to provide automatic white balancing in a video camera. In addition, restricting the degree to which color correction gain is applied is taught.

Another approach that combines color correction with tone scale corrections is based on random sampling within a digitized image and subsequently modifying the resulting histogram of these samples. U.S. Pat. No. 4,677,465 issued Jun. 30, 1987, to J. S. Alkofer, entitled "Digital Color Image Processing Method with Shape Correction of Histograms Used to Produce Color Reproduction Functions," and U.S. Pat. No. 4,729,016 issued Mar. 1, 1988 to J. S. Alkofer, entitled "Digital Color Image Processing Method and Apparatus Employing Three Color Reproduction Functions for Adjusting Both Tone Scale and Color Balance," disclose relatively complex methods that utilize these samples in a plurality of segmented contrast intervals through normalization techniques and with comparison to image population data.

SUMMARY OF THE INVENTION

It is an object of the present invention to provide an improved color image by using an image processing method and means that overcome the problems, such as color subject failure and dependency on film population data, noted above.

The method of the present invention is based on the assumption that the red, green and blue standard deviations, particularly of high spatial frequency information as calculated in a particular space, e.g. a power law space, should be equal.

According to the present invention there is provided a method of correcting the color balance of a color image comprising a plurality of channels, comprising the steps of:

capturing the image;

transforming each channel of the image into a power law space;

storing the transformed channels;

spatially filtering the transformed channels with at least one filter to generate at least one filtered image;

calculating the standard deviation of each of the filtered transformed channels;

determining a reference standard deviation;

forming a ratio between the reference standard deviation and the standard deviation of each filtered transformed channel; and applying the ratio as a multiplicative gain factor to each stored transformed channel to provide a color corrected image.

The channels may be filtered spatially with either band-pass filters or high-pass filters. It is possible to include additional steps to further improve the color of the image.

The invention further provides means for correcting the color balance of an image comprising a plurality of channels, comprising:

means for capturing the image;

means for transforming each channel of the image into a power law space;

means for storing the transformed channels;

filter means for spatially filtering the transformed channels to generate at least one filtered image;

calculating means for calculating the standard deviation of each of the filtered transformed channels;

means for determining a reference standard deviation;

means for calculating the ratio between the reference standard deviation and the standard deviation of each of the filtered transformed channels; and means for applying the ratio as a multiplicative gain factor to each of the stored transformed channels to provide a color corrected image.

Advantageous Effect of the Invention

The present invention provides a color image with significantly reduced color biases or correction errors than those provided by methods and apparatus found in the prior art.

The above and other objects, features and advantages of the present invention will become apparent from the following description of a preferred embodiment, in connection with the accompanying drawings.

DETAILED DESCRIPTION OF THE INVENTION

Figure 1:
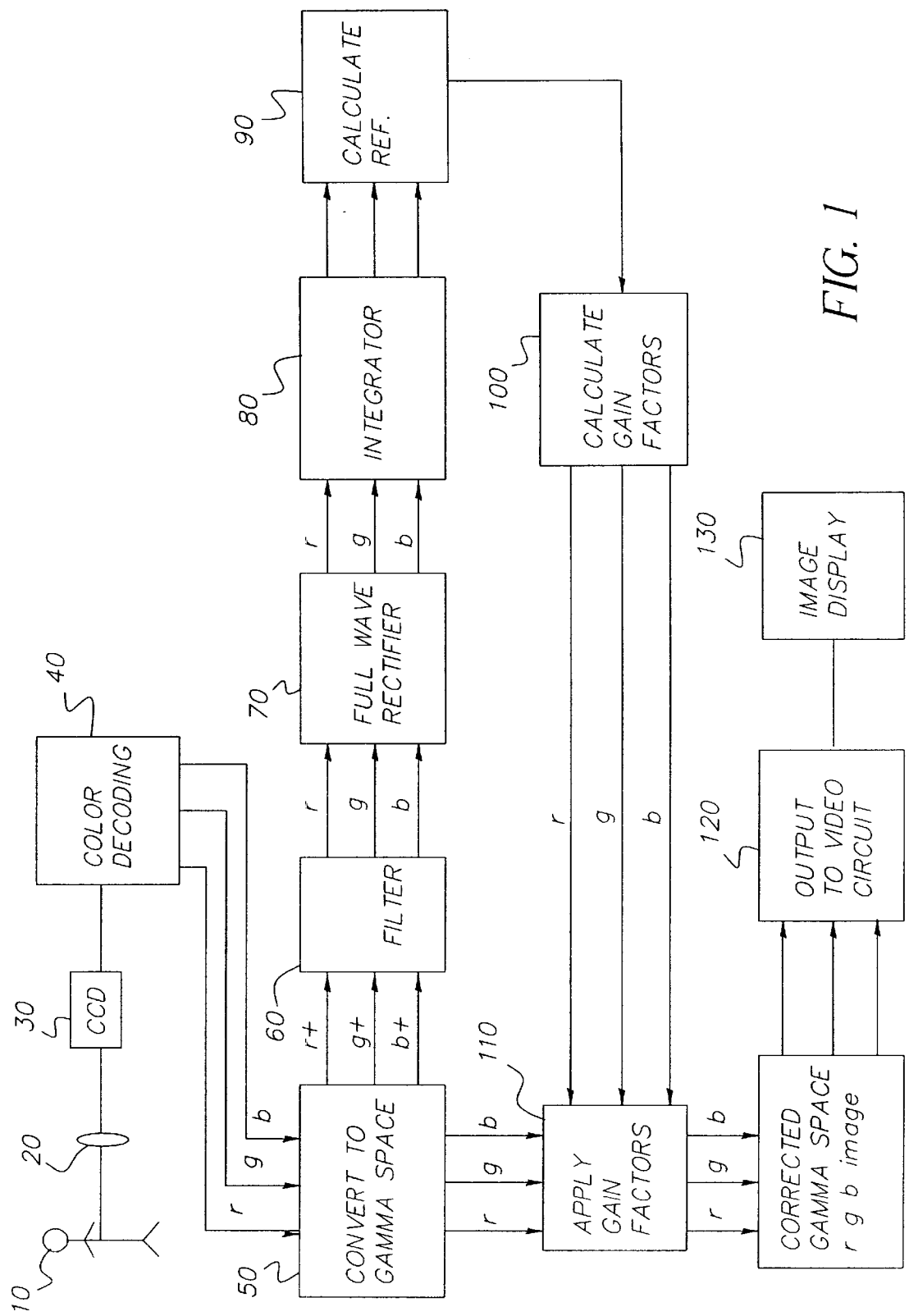
FIG. 1 is a block diagram illustrating apparatus for performing the present invention.

FIG. 1 is a block diagram illustrating apparatus for performing the present invention.

Referring to FIG. 1, light from the scene object 10 is imaged through lens 20 onto a light sensitive device or CCD 30. The color decoding device 40 separates the multiplexed color signals from CCD 30 into red, green and blue electronic signals. The red, green and blue signals are applied to a gamma space converter 50 to produce gamma electronic signals. The gamma signals are applied to a high-pass or band-pass filtering means 60 the output of which is passed to a full wave rectifying means 70 to produce rectified signals that have only positive levels, the full wave rectifying means having converted all negative going filtered signal levels to positive levels. The rectified signals are applied to an integrator 80. The integrated signals from integrator 80 are applied to reference determining means 90 to determine a reference integrated signal. The output of the reference determining means 90 and the integrator 80 are applied to a calculating means 100 to produce gain factor signals. The calculated gain factor signals are then applied to the gamma signals from gamma space converter 50 in multiplying means 110 to produce corrected gamma signals that can be applied to video circuits 120 for final image display 130.

Figure 2:
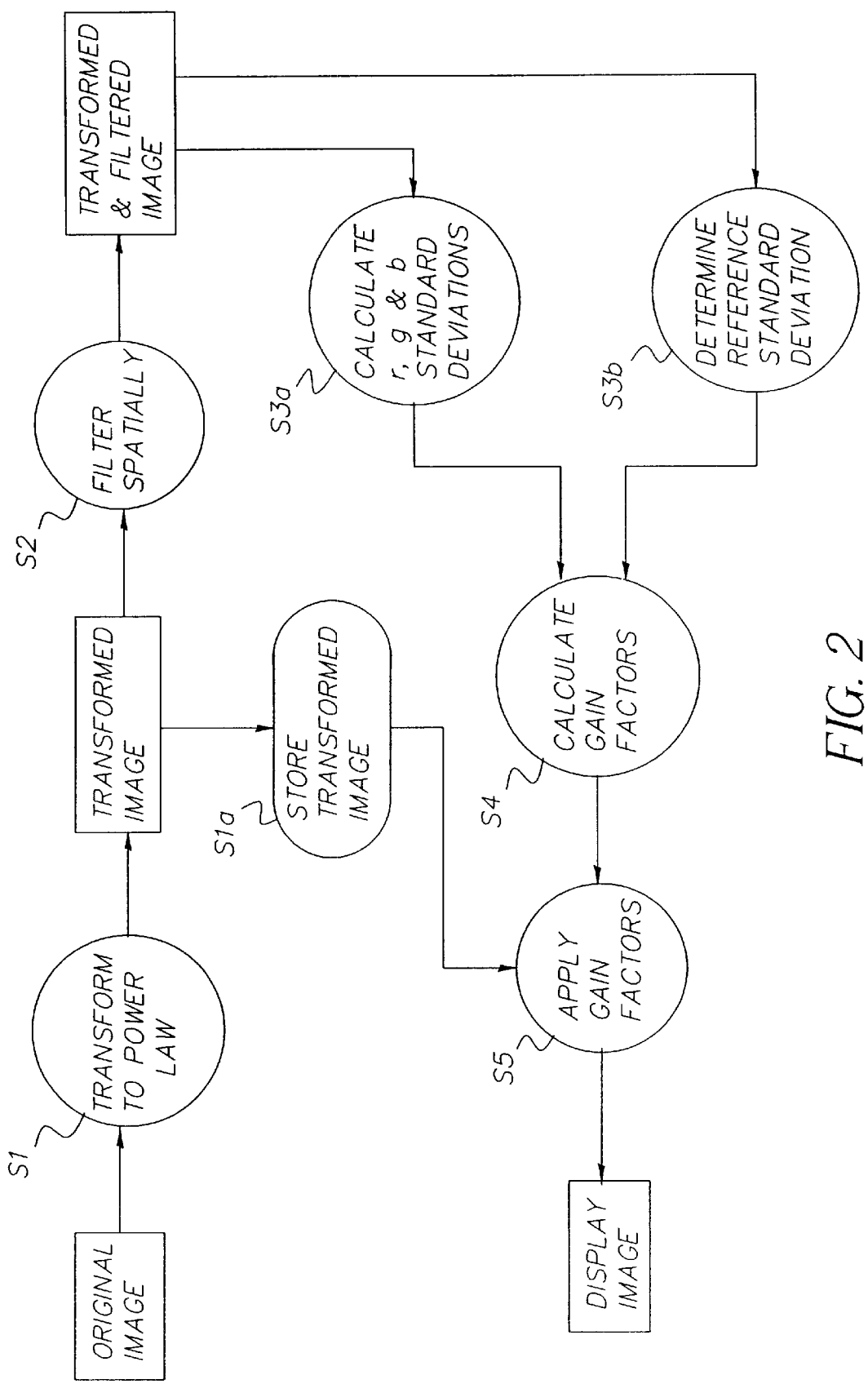
FIG. 2 is a flow chart setting out the steps of a first embodiment of the method of present invention.

FIG. 2 is a flow chart for explaining a first embodiment of the method of the invention. At step S1 the original image, comprising a number of color channels, is transformed into a power law space. At step S1a the transformed channels are stored in an image buffer or store for subsequent processing.

A power law space PL, is most generally defined as:

$$PL = (1+A) * S^{**} P - A \quad (1a)$$

for $S > \{A/[(1-P)*(1+A)]\}^{**}(1/P)$ $$PL = \{P*(1+A)*\{A/[(1-P)*(1+A)]\}^{**}[(P-1)/P]\}*S \quad (1b)$$

for $0 <= S <= \{A/[(1-P)*(1+A)]\}^{**}(1/P)$ where PL is the power law representation of the original scene S. The original scene S may be acquired directly, in the case of a digital or video camera, or may be the result of scanning color negative or reversal films or prints and transforming the scanned information to remove any biases owing to the filming or scanning processes. A is a constant and is used to limit the maximum slope as S approaches zero. Note that if A=0, the entire curve is represented by the first line of equation (1a) and P=1 produces a linear relationship between S and PL. An example of such a power law transformation is that used by the Photo CD system described in *A Planning Guide for Developers Kodak Photo CD Products*, copyright Eastman Kodak Company, 1992, pg. 25.

At step S2 the resulting transformed channels are filtered spatially. FIG. 2 shows only one filter for the sake of clarity. However, the image may be filtered by a number of filters. Each of the transformed red, green and blue channels are filtered by each filter. The filters used may be either all high-pass filters, all band-pass filters or a combination of both high pass and band-pass filters.

The spatial filtering operation is typically performed by applying a finite impulse response (FIR) or infinite impulse response (IIR) filter to a digital image. Preferably a two-dimensional filter is used, although more computationally efficient one dimensional filters may be employed with little degradation to the final result.

| Two dimensional high-pass FIR filter: | | | | |
|---|---|---|---|---|
| −1 | −1 | −1 | | |
| −1 | 8 | −1 | | |
| −1 | −1 | −1 | | |
| Two dimensional band-pass FIR filter: | | | | |
| 0 | −1 | −1 | −1 | 0 |
| −1 | 0 | 2 | 0 | −1 |
| −1 | 2 | 4 | 2 | −1 |
| −1 | 0 | 2 | 0 | −1 |
| 0 | −1 | −1 | −1 | 0 |
| One dimensional high-pass FIR filter: | | | | |
| −1 | 2 | −1 | | |
| One dimensional band-pass FIR filter: | | | | |
| −1 | 0 | 2 | 0 | −1 |

These filters are applied to the digitized image by convolution methods well known to those skilled in the art. Note that for each of these filters, the sum of the coefficients equals zero resulting in zero response at zero spatial frequency (DC). This zero response at DC feature tends to eliminate the contribution of a dominant color thus reducing the color subject failures.

If the image has high spatial frequency noise, then a band-pass spatial filter may be preferable to the simpler high pass spatial filter. The above described filters all provide a filtered image and subsequent gain correction factors that improve the color balance of color biased images. Image sizes from 50 pixels and larger (in the smaller spatial dimension) can be applied to this method.

At step S3a the standard deviation of each of the filtered transformed red, green and blue channels is calculated. The standard deviation, SD, is calculated using the following equation;

$$SD = \left[ \left\{ \sum_{i,j=0,0}^{n,m} (Xij - \overline{X})^{}2 \right\} \Big/ (N-1) \right]^{} 0.5 \quad (2)$$

where i and j are indices for the horizontal and vertical directions for each sampled pixel within the image, N is the number of pixels in the image and equals n times m, and $\overline{X}$ is the mean value of the image and is further defined as:

$$\overline{X} = \left\{ \sum_{i,j=0,0}^{n,m} Xij \right\} \Big/ N \quad (3)$$

At step S3b a reference standard deviation is determined. The reference standard deviation may be one of the standard deviations of the transformed red, green or blue channels. Alternatively, the reference standard deviation may be calculated from a combination of the standard deviations of the transformed red, green and blue channels or may be calculated as the standard deviation of the signal resulting from a combination of the transformed channels. An example combination of channels is to form a luminance signal from the red, green and blue channel information. An example luminance L used in CCIR Recommendation 601-1 for television is:

$$L = 0.299 * red + 0.587 * green + 0.114 * blue \quad (4)$$

where L is the luminance signal formed by the weighted linear combination of red, green, and blue colored signals.

At step S4 the gain factors to be applied to the stored transformed channels are calculated. The gain factors are based on the ratios of the selected reference standard deviation to the other calculated standard deviations. At step S5 the calculated gain factors are applied to the stored transformed channels and the resulting image is further transformed to enable an output display of the scene.

It will be understood by those skilled in the art that further steps can be included to refine the color correction.

Figure 3:
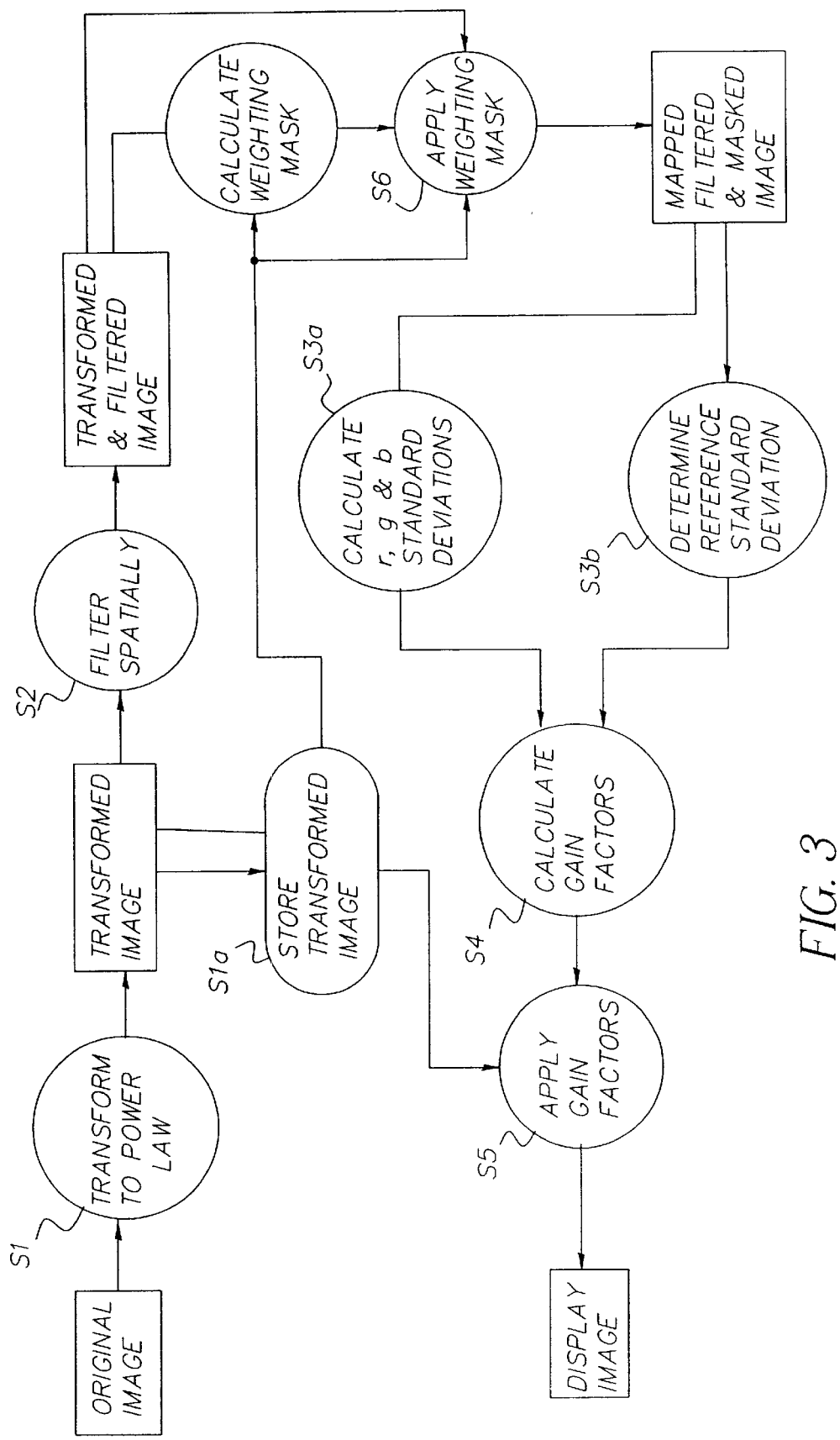
FIG. 3 is a flow chart setting out the steps of a second embodiment of the invention.

FIG. 3 is a flow chart for explaining a second embodiment of the method of the invention.

Steps identical to those of the flow chart of FIG. 2 are indicated by identical reference numerals with reference to the flow chart shown in FIG. 3. The second embodiment shown in FIG. 3 is identical to the first embodiment shown in FIG. 2 except for the following points.

The second embodiment has an additional step S6. After step S1, in which the original scene is transformed into a power law space, at least one weighting mask is applied to the resulting transformed channels at step S6. This weighting mask assigns a weight between zero and one to each pixel based on characteristics of the data at that pixel. For example, a mask based on the stored transformed channels can assign a lower weight to more saturated pixels and a higher weight to less-saturated pixels. In a like manner, a mask based on the high-pass or band-pass filtered image can assign a lower weight to more saturated pixels and a higher weight to less saturated pixels. An example of such a mask, for a transformed image where the code values range from 0 to 255 for the three r, g, and b channels, is $$(r-g)2 + (b-g)2 + (r-b)**2 > 9500 \quad (5a)$$

Wij=0

$$(r-g)2 + (b-g)2 + (r-b)**2 <= 9500 \quad (5b)$$

Wij=1.0 with Wij being the weighting factor for pixel location i,j.

Another example of a weighting mask is one that eliminates clipped pixels (pixels with code values of 0 or 255 in any of the red, green, or blue channels).

The introduction of a weighting mask, with the possibility of having weights not equal to zero or one requires a modification to the equation for the standard deviation. A standard deviation-like calculation is performed on the red, green, and blue filtered transformed image and in a like manner, the reference standard deviation-like calculation SD' is based on the following equation:

$$SD' = \{ \Sigma_{i,j=0,0}^{n,m} Wij * |Xij - \bar{X}| y \} z \quad (6)$$

where y is typically, but not essentially, equal to 2 and z is typically, but not essentially, equal to 0.5. Note that this equation is similar to the equation to standard deviation, SD, equation (2) with the weighting, Wij added, and the denominator eliminated. As the final gain factors are calculated based on ratios of values from either equation (2) or (6), a constant valued denominator cancels out in this calculation.

In the embodiment shown in FIG. 3 the mask is applied to both the stored transformed channels and to the filtered transformed channels. It is envisaged that, alternatively, the mask may be applied to only one of the stored or filtered transformed channels.

Figure 4:
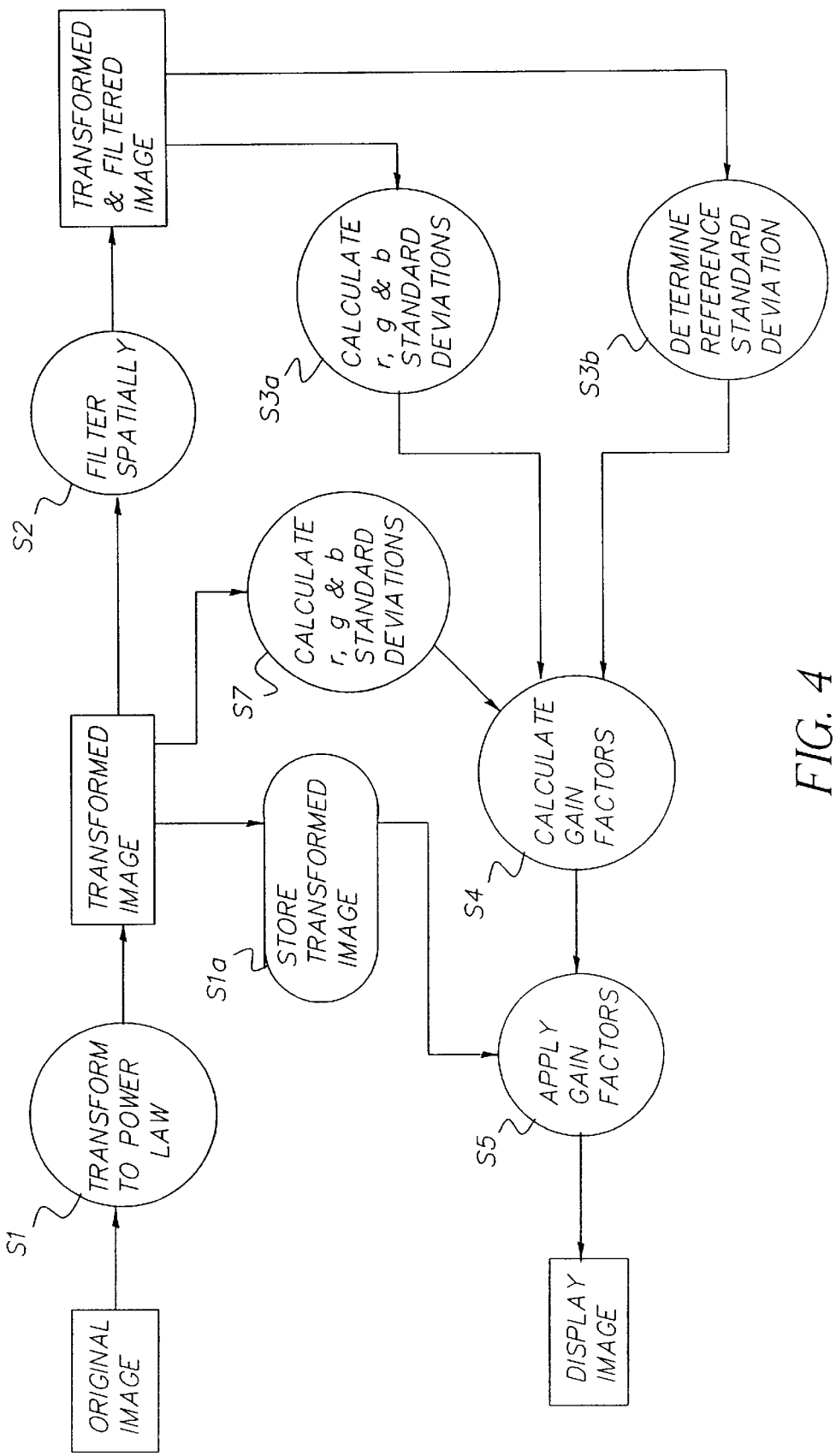
FIG. 4 is a flow chart setting out the steps of a third embodiment of the invention.

FIG. 4 is a flow chart for explaining a third embodiment of the method of the invention.

Steps identical to those of the flow chart of FIG. 2 are indicated by identical reference numerals with reference to the flow chart shown in FIG. 4. The third embodiment shown in FIG. 4 is identical to the first embodiment shown in FIG. 2 except for the following points.

The third embodiment has an additional step S7. At step S7 the standard deviation of each of the stored transformed red, green and blue channels is calculated. The gain factors calculated in step S4 are based on a combination of the standard deviations calculated from the stored transformed red, green and blue channels and the standard deviations calculated from the filtered transformed red, green and blue channels.

A further preferred embodiment of the invention, not illustrated, combines the additional steps of both the second and third embodiments.

It will be understood by those skilled in the art that any suitable standard deviation or standard deviation-like equation can be applied and the scope of the invention is not limited to that used in the specific description, as explained with reference to FIG. 3.

The method of the invention is simple and less complicated than those of the prior art.

The method overcomes the problems associated with images of a scene highly colored in a predominant color.

The method is useful in desktop imaging applications and could potentially be used in algorithms for optical printers (mini lab, color timing for motion picture, high speed printers, etc.) as well as transmission and reflection scanners, video cameras and video displays/televisions. The apparatus required to implement the method of the invention is simple and low cost.

I claim:

1. A method of correcting the color balance of a color image comprising a plurality of channels, comprising the steps of:

capturing the image;

transforming each channel of the image into a power law space;

storing the transformed channels;

spatially filtering the transformed channels with at least one filter to generate at least one filtered image;

calculating the standard deviation of each of the filtered transformed channels;

determining a reference standard deviation;

forming a ratio between the reference standard deviation and the standard deviation of each filtered transformed channel; and applying the ratio as a multiplicative gain factor to each stored transformed channel to provide a color corrected image.

2. A method as claimed in claim 1 wherein the image is filtered by at least one bandpass filter.

3. A method as claimed in claim 2 wherein the image is filtered by at least one high pass filter.

4. A method as claimed in claim 3 wherein the reference standard deviation is selected from one of the standard deviations of the filtered transformed channels.

5. A method as claimed in claim 3 wherein the reference standard deviation is a combination of the standard deviations of the filtered transformed channels.

6. A method as claimed in claim 1 wherein the channels are red, green and blue channels.

7. A method as claimed in claim 1 including the step of calculating the standard deviations of each of the stored transformed channels and using a combination of these standard deviations and those calculated from the filtered transformed channels to generate the gain factors.

8. A method as claimed in claim 1 including the step of applying at least one weighting mask to at least one of the stored transformed channels or the filtered transformed channels prior to calculating the standard deviations of each of the filtered transformed channels.

* * * * *